(12) United States Patent
Yang et al.

(10) Patent No.: US 12,189,900 B2
(45) Date of Patent: Jan. 7, 2025

(54) TOUCH DETECTION SYSTEM AND TOUCH DETECTION METHOD FOR DETERMINING WHETHER A TOUCH EVENT IS TRIGGERED BY A STYLUS

(71) Applicant: HIMAX TECHNOLOGIES LIMITED, Tainan (TW)

(72) Inventors: Fong-Wei Yang, Tainan (TW); Min-Chi Kao, Tainan (TW); Chung-Wen Chang, Tainan (TW); Ming-Kai Cheng, Tainan (TW); Tzu-Hsi Yang, Tainan (TW); Wen-Sen Su, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/131,851

(22) Filed: Apr. 6, 2023

(65) Prior Publication Data
US 2024/0338098 A1 Oct. 10, 2024

(51) Int. Cl.
G06F 3/03 (2006.01)
G06F 3/0354 (2013.01)
G06F 3/041 (2006.01)

(52) U.S. Cl.
CPC ...... *G06F 3/04186* (2019.05); *G06F 3/03545* (2013.01)

(58) Field of Classification Search
CPC ............. G06F 3/04186; G06F 3/03545; G06F 3/04162; G06F 3/04182; G06F 3/0441; G06F 3/0442; G06F 3/0443; G06F 3/0446; G06F 3/03; G06F 3/04
See application file for complete search history.

(56) References Cited

U.S. PATENT DOCUMENTS

| | | | | |
|---|---|---|---|---|
| 2011/0242060 A1* | 10/2011 | McGibney | ............ | G06F 3/0428 345/179 |
| 2014/0192031 A1* | 7/2014 | Je | ........................ | G06F 3/03545 345/179 |
| 2015/0169102 A1* | 6/2015 | Liu | ......................... | G06F 3/041 345/174 |
| 2016/0085373 A1* | 3/2016 | Chang | .................. | G06F 3/0428 345/175 |
| 2016/0357298 A1* | 12/2016 | Kim | ..................... | G06F 3/04883 |
| 2017/0205944 A1* | 7/2017 | Kim | ..................... | G06V 40/1306 |

(Continued)

FOREIGN PATENT DOCUMENTS

TW 201741820 A 12/2017
TW 201941027 A 10/2019

*Primary Examiner* — Lunyi Lao
*Assistant Examiner* — Jarurat Suteerawongsa
(74) *Attorney, Agent, or Firm* — Winston Hsu

(57) ABSTRACT

A touch detection system includes a stylus, a panel and a processing circuit. The panel can include a plurality of sensing cells used to receive a first signal and a second signal generated by a touch event. The processing circuit can be coupled to the panel and used to determine a plurality of first areas and a plurality of first intensities corresponding to the first signal, determine a plurality of second areas and a plurality of second intensities corresponding to a second signal, and determine whether the touch event is triggered by the stylus touching the panel according to the first intensities, first areas, the second intensities and the second areas.

13 Claims, 7 Drawing Sheets

(56) References Cited

U.S. PATENT DOCUMENTS

2017/0322661 A1\* 11/2017 Varje ................. G06F 3/044
2018/0143703 A1\* 5/2018 Fleck ................ G06F 3/0383
2018/0181787 A1\* 6/2018 Jee .................. G06V 40/1306

\* cited by examiner

| | TX1 | TX2 | TX3 | TX4 | TX5 | TX6 | TX7 | TX8 | TX9 | TX10 | TX11 | TX12 | TX13 | TX14 | TX15 |
|---|---|---|---|---|---|---|---|---|---|---|---|---|---|---|---|
| RX13 | 0 | 0 | 0 | 0 | 0 | 0 | 0 | 0 | 0 | 0 | 0 | 0 | 0 | 0 | 0 |
| RX14 | 0 | 0 | 0 | 0 | 0 | 0 | 0 | 0 | 0 | 0 | 0 | 0 | 0 | 0 | 0 |
| RX15 | 0 | 0 | 0 | 0 | 0 | 0 | 0 | 0 | 0 | 0 | 0 | 0 | 0 | 0 | 0 |
| RX16 | 0 | 0 | 0 | 0 | 0 | 0 | 0 | 0 | 0 | 0 | 0 | 0 | 0 | 0 | 0 |
| RX17 | 0 | 0 | 0 | 0 | 0 | 0 | 0 | 0 | 0 | 0 | 0 | 0 | 0 | 0 | 0 |
| RX18 | 0 | 0 | 0 | 11 | 16 | 21 | 27 | 38 | 24 | 11 | 11 | 20 | 0 | 0 | 0 |
| RX19 | 0 | 0 | 0 | 1 | 15 | 8 | 9 | 38 | 8 | 13 | 15 | 21 | 0 | 0 | 0 |
| RX20 | 0 | 0 | 0 | 25 | 4 | 25 | 36 | 70 | 24 | 13 | 12 | 16 | 0 | 0 | 0 |
| RX21 | 0 | 0 | 0 | 3 | 14 | 35 | 218 | 703 | 142 | 3 | 16 | 24 | 0 | 0 | 0 |
| RX22 | 0 | 0 | 0 | 21 | 13 | 48 | 604 | 3139 | 235 | 15 | 12 | 12 | 0 | 0 | 0 |
| RX23 | 0 | 0 | 0 | 4 | 13 | 21 | 88 | 303 | 10 | 7 | 23 | 26 | 0 | 0 | 0 |
| RX24 | 0 | 0 | 0 | 25 | 21 | 24 | 27 | 65 | 18 | 10 | 13 | 12 | 0 | 0 | 0 |
| RX25 | 0 | 0 | 0 | 9 | 9 | 18 | 15 | 43 | 10 | 16 | 16 | 10 | 0 | 0 | 0 |
| RX26 | 0 | 0 | 0 | 24 | 23 | 24 | 19 | 65 | 31 | 16 | 10 | 21 | 0 | 0 | 0 |
| RX27 | 0 | 0 | 0 | 0 | 0 | 0 | 0 | 0 | 0 | 0 | 0 | 0 | 0 | 0 | 0 |

(Corresponding to the first signal S1)

(Corresponding to the second signal S2)

| | TX1 | TX2 | TX3 | TX4 | TX5 | TX6 | TX7 | TX8 | TX9 | TX10 | TX11 | TX12 | TX13 | TX14 | TX15 |
|---|---|---|---|---|---|---|---|---|---|---|---|---|---|---|---|
| RX13 | 0 | 0 | 0 | 0 | 0 | 0 | 0 | 0 | 0 | 0 | 0 | 0 | 0 | 0 | 0 |
| RX14 | 0 | 0 | 0 | 0 | 0 | 0 | 0 | 0 | 0 | 0 | 0 | 0 | 0 | 0 | 0 |
| RX15 | 0 | 0 | 0 | 0 | 0 | 0 | 0 | 0 | 0 | 0 | 0 | 0 | 0 | 0 | 0 |
| RX16 | 0 | 0 | 0 | 0 | 0 | 0 | 0 | 0 | 0 | 0 | 0 | 0 | 0 | 0 | 0 |
| RX17 | 0 | 0 | 0 | 0 | 0 | 0 | 0 | 0 | 0 | 0 | 0 | 0 | 0 | 0 | 0 |
| RX18 | 0 | 0 | 0 | 0 | 114 | 77 | 68 | 82 | 67 | 52 | 43 | 0 | 0 | 0 | 0 |
| RX19 | 0 | 0 | 0 | 0 | 18 | 32 | 81 | 142 | 45 | 34 | 56 | 43 | 74 | 0 | 0 |
| RX20 | 0 | 0 | 0 | 0 | 99 | 98 | 133 | 217 | 223 | 182 | 114 | 28 | 16 | 0 | 0 |
| RX21 | 0 | 0 | 0 | 0 | 53 | 63 | 82 | 278 | 330 | 297 | 112 | 66 | 63 | 0 | 0 |
| RX22 | 0 | 0 | 0 | 0 | 85 | 104 | 116 | 171 | 355 | 316 | 155 | 50 | 34 | 0 | 0 |
| RX23 | 0 | 0 | 0 | 0 | 75 | 82 | 117 | 266 | 232 | 245 | 89 | 108 | 50 | 0 | 0 |
| RX24 | 0 | 0 | 0 | 0 | 99 | 95 | 118 | 162 | 166 | 138 | 84 | 49 | 4 | 0 | 0 |
| RX25 | 0 | 0 | 0 | 0 | 18 | 19 | 90 | 36 | 32 | 74 | 16 | 52 | 24 | 0 | 0 |
| RX26 | 0 | 0 | 0 | 0 | 41 | 64 | 54 | 68 | 54 | 36 | 28 | 16 | 13 | 0 | 0 |
| RX27 | 0 | 0 | 0 | 0 | 0 | 0 | 0 | 0 | 0 | 0 | 0 | 36 | 85 | 0 | 0 |

(Corresponding to the second signal S2)

| | TX21 | TX22 | TX23 | TX24 | TX25 | TX26 | TX27 | TX28 | TX29 |
|---|---|---|---|---|---|---|---|---|---|
| RX56 | 165 | 102 | 95 | 84 | 122 | 186 | 52 | 160 | 131 |
| RX55 | 94 | 56 | 59 | 78 | 130 | 83 | 27 | 123 | 56 |
| RX54 | 121 | 97 | 76 | 94 | 124 | 130 | 62 | 161 | 96 |
| RX53 | 67 | 73 | 47 | 98 | 310 | 191 | 78 | 127 | 39 |
| RX52 | 109 | 95 | 89 | 164 | 504 | 433 | 199 | 152 | 109 |
| RX51 | 55 | 49 | 74 | 69 | 224 | 275 | 95 | 135 | 101 |
| RX50 | 132 | 104 | 117 | 42 | 137 | 158 | 79 | 150 | 63 |
| RX49 | 92 | 61 | 68 | 59 | 105 | 90 | 32 | 123 | 31 |
| RX48 | 116 | 94 | 89 | 64 | 85 | 163 | 90 | 114 | 84 |

TOUCH DETECTION SYSTEM AND TOUCH DETECTION METHOD FOR DETERMINING WHETHER A TOUCH EVENT IS TRIGGERED BY A STYLUS

BACKGROUND OF THE INVENTION

1. Field of the Invention

The disclosure is related to a touch detection system and a touch detection method, and more particularly, a touch detection system and a touch detection method used to determine whether a touch event is triggered by a stylus touching a panel.

2. Description of the Prior Art

With the popularization of tablets and smart phones, the use of touch panels increases significantly. Currently, there are panels supporting finger touch and stylus touch. However, it is difficult to discern if a touch is triggered by a stylus or a finger.

In practice, finger touches or noises are often mistakenly recognized as stylus touches. Hence, a solution is still in need in the field to identify stylus touches from various forms of touches.

SUMMARY OF THE INVENTION

An embodiment provides a touch detection system including a stylus, a panel and a processing circuit. The panel can include a plurality of sensing cells used to receive a first signal and a second signal generated by a touch event. The processing circuit can be coupled to the panel and used to determine a plurality of first areas and a plurality of first intensities corresponding to the first signal, determine a plurality of second areas and a plurality of second intensities corresponding to a second signal, and determine whether the touch event is triggered by the stylus touching the panel according to the first intensities, first areas, the second intensities and the second areas.

Another embodiment provides a touch detection method for a touch detection system. The touch detection system can include a stylus, a panel and a processing circuit. The panel can include a plurality of sensing cells. The processing circuit can be coupled to the panel. The method can include the sensing cells receiving a first signal and a second signal generated by a touch event, the processing circuit determining a plurality of first areas and a plurality of first intensities corresponding to the first signal, the processing circuit determining a plurality of second areas and a plurality of second intensities corresponding to a second signal, and the processing determine whether the touch event is triggered by the stylus touching the panel according to the first intensities, first areas, the second intensities and the second areas.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates the distribution of the intensities of the first signal on the panel where the stylus touches the panel according to an example.

FIG. 4 illustrates the distribution of the intensities of the second signal on the panel where the stylus touches the panel according to the example of FIG. 3.

FIG. 6 illustrates the distribution of the intensities of the second signal on the panel where the stylus does not touch the panel according to the example of FIG. 5.

DETAILED DESCRIPTION

Figure 1:
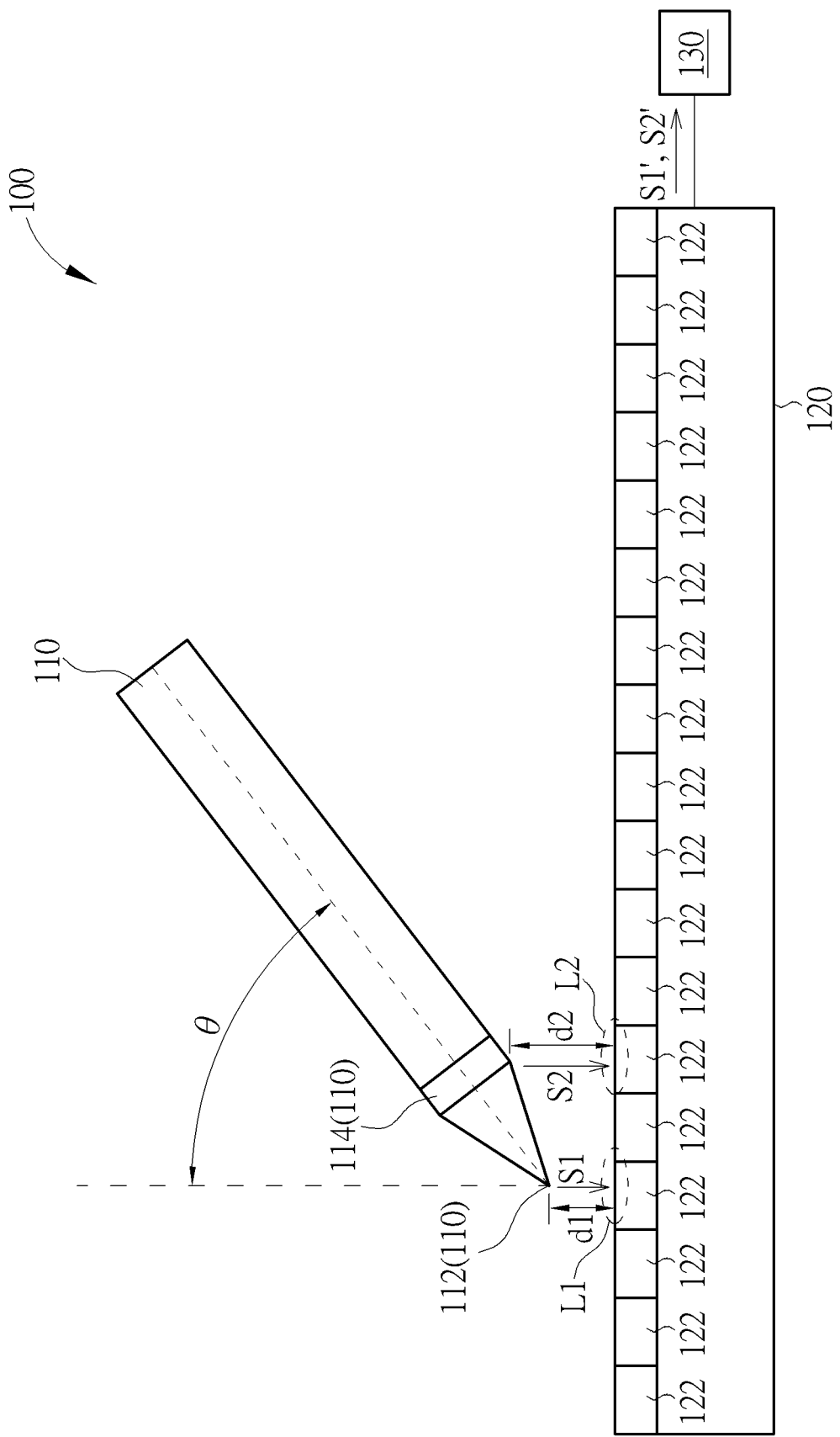
FIG. 1 illustrates a touch detection system according to an embodiment.

FIG. 1 illustrates a touch detection system 100 according to an embodiment. The touch detection system 100 can include a stylus 110, a panel 120 and a processing circuit 130. The stylus 110 can include a pen-tip portion 112 and a pen-ring portion 114. The pen-tip portion 112 can be at a pointed portion of the stylus 110, and the pen-ring portion 114 can be at the barrel portion of the stylus 110. The panel 120 can include a plurality of sensing cells 122 used to receive signals for touch detection. For example, when the stylus 110 touches the panel 120, the pen-tip portion 112 can transmit a first signal S1, the pen-ring portion 114 can transmit a second signal S2, and the sensing cells 122 of the panel 120 can receive the first signal S1 and the second signal S2 for detecting the stylus 110 according to the first signal S1 and the second signal S2. The processing circuit 130 can be coupled to the panel 120 to process the signals S1' and S2' corresponding to the first signal S1 and the second signal S2 respectively to detect the touch event triggered by the stylus 110. For example, the processing circuit 130 can include a TDDI (touch with display driver integrated circuit) operated with specific application programs.

The first signal S1 can have a first frequency, and the second signal S2 can have a second frequency different from the first frequency. For example, the first signal S1 can be of 385 kHz, the second signal S2 can be of 200 kHz, and embodiments are not limited thereto. As shown in FIG. 1, when the stylus 110 touches the panel 120, the related locations and signal intensities of the first signal S1 and the second signal S2 can vary with the angle θ of the stylus 110, as described below.

When the angle θ is smaller, the stylus 110 is less tilted, and the locations L1 and L2 corresponding to the first signal S1 and the second signal S2 are closer to one another. The distance d1 can be between the pen-tip portion 112 and the panel 120, and the distance d2 can be between the pen-ring portion 114 and the panel 120. When angle θ is smaller, the difference between the distances d1 and d2 is larger, and the difference between the intensities of the first signal S1 and the second signal S2 received by the panel 120 is greater.

When the angle θ is larger, the stylus 110 is more tilted, and the distance between the locations L1 and L2 is greater. The difference between the distances d1 and d2 is smaller, and the difference between the intensities of the first signal S1 and the second signal S2 received by the panel 120 is smaller.

In FIG. 1, the first signal S1 and the second signal S2 are sent by the stylus 110. However, it is observed sometimes the first signal S1 and the second signal S2 of specific frequencies are received by the sensing cells 122 when the stylus 110 is unused. In this scenario, the first signal S1 and the second signal S2 may be triggered by noises or hand touch. Hence, a solution is needed to determine if the first signal S1 and the second signal S2 are triggered by the stylus 110 touching the panel 120 when a touch event is detected. In order to deal with this kind of problem, a solution is provided by embodiments to determine whether a touch event is triggered by the stylus 110 touching the panel 120, as below.

Figure 2:
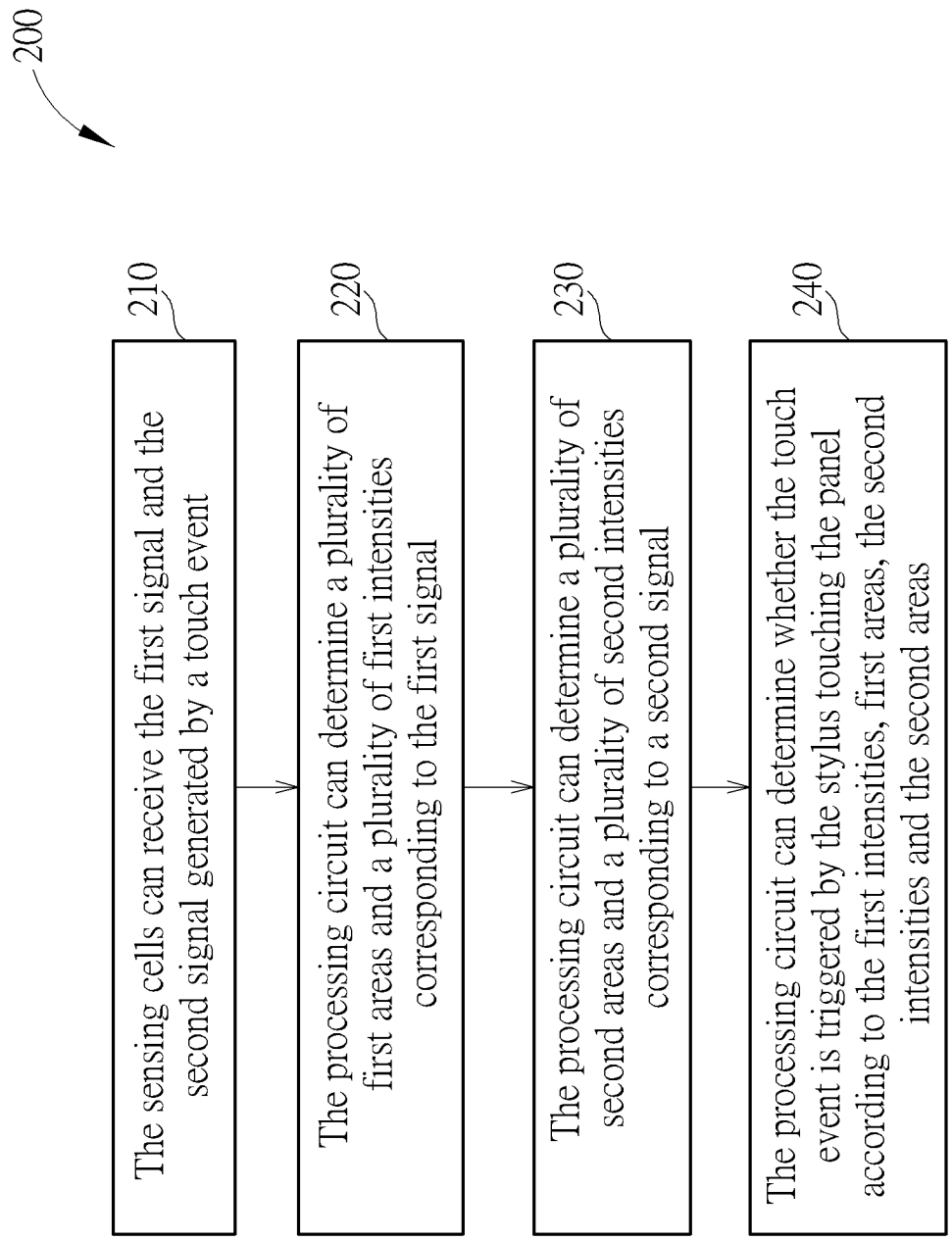
FIG. 2 illustrates a flowchart of a detection method for the detection method according to an embodiment.

FIG. 2 illustrates a flowchart of a detection method 200 for the touch detection system 100 according to an embodiment. The detection method 200 can include the following steps.

Step 210: the sensing cells 122 can receive the first signal S1 and the second signal S2 generated by a touch event;

Step 220: the processing circuit 130 can determine a plurality of first areas and a plurality of first intensities corresponding to the first signal S1;

Step 230: the processing circuit 130 can determine a plurality of second areas and a plurality of second intensities corresponding to a second signal S2; and Step 240: the processing circuit can determine whether the touch event is triggered by the stylus 110 touching the panel 120 according to the first intensities, first areas, the second intensities and the second areas.

Figure 5:
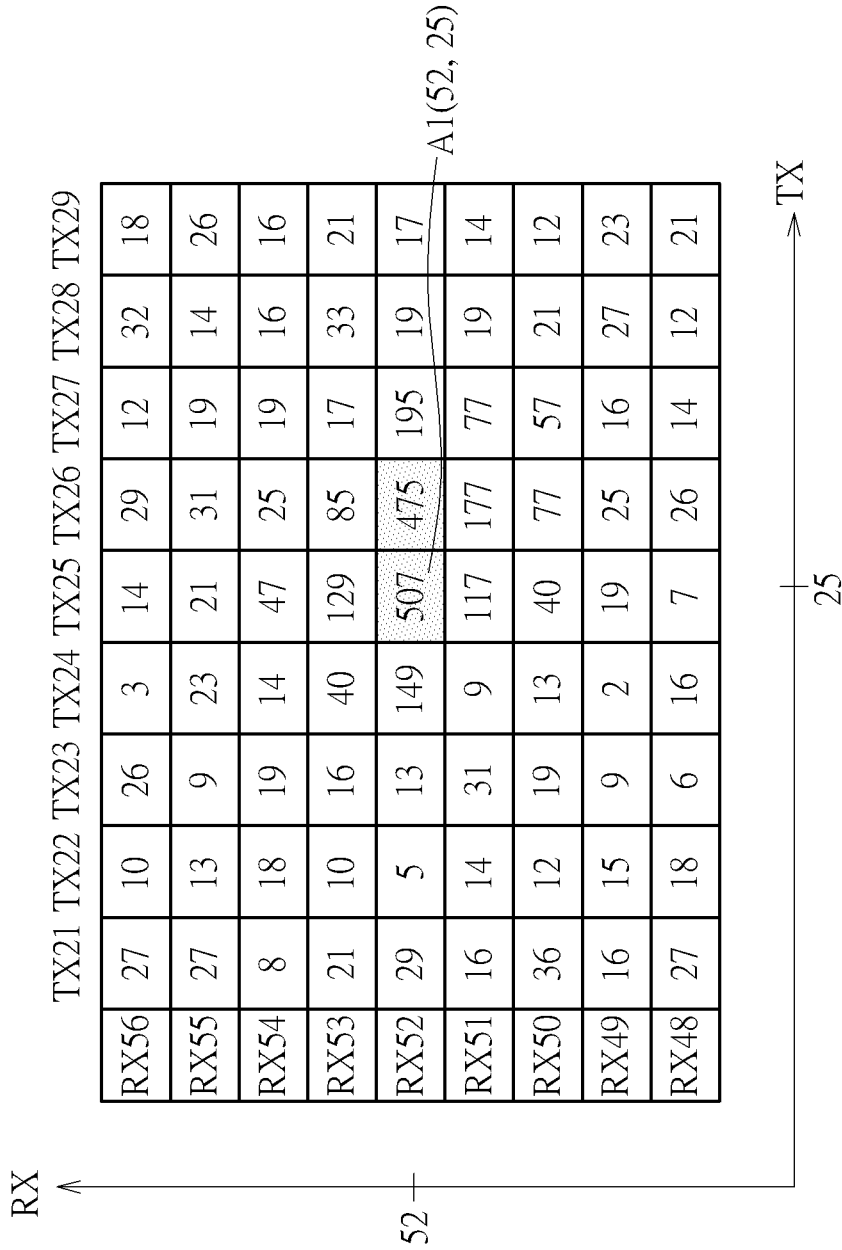
FIG. 5 illustrates the distribution of the intensities of the first signal on the panel where the stylus does not touch the panel according to an example.

In Step 210, the first signal S1 can have a first frequency, and the second signal S2 can have a second frequency different from the first frequency. FIG. 3 to FIG. 6 illustrate examples for explaining the flow in FIG. 2. In FIG. 3 and FIG. 4, an example of the stylus 110 touching the panel 120 is provided. In FIG. 5 and FIG. 6, an example where the stylus 110 does not touch the panel 120 is provided. FIG. 3 to FIG. 6 can be corresponding to top views of the panel 120. FIG. 3 and FIG. 5 show the distributions of the intensities of the first signal S1. FIG. 4 and FIG. 6 show the distributions of the intensities of the second signal S2.

In FIG. 3 to FIG. 6, the vertical axis can be corresponding to horizontal signal lines of receiving signals (noted as RX), and the horizontal axis can be corresponding to vertical signal lines of transmitting signals (noted as TX). In FIG. 3 to FIG. 6, each block can be an area having coordinates, and the first coordinate and the second coordinate of the coordinates are corresponding to the vertical axis and the horizontal axis respectively.

FIG. 3 illustrates a distribution of the first intensities of the first signal S1 in a scenario where the stylus 110 touches the panel 120. FIG. 4 illustrates a distribution of the second intensities of the second signal S2 in the scenario of FIG. 3. In FIG. 3 and FIG. 4, each block is corresponding to an area in the top view of the panel 120, and each number means a signal intensity on the corresponding area. In FIG. 3, three shadowed blocks are corresponding to the first signal S1. The three shadowed blocks in FIG. 3 can be described as Table 1:

TABLE 1

| Coordinates of area | (22, 6) | (21, 7) | (22, 7) |
|---|---|---|---|
| Corresponding signal | S1 | S1 | S1 |
| Signal intensity | 604 | 703 | 3139 (first maximum) |
| Note | | | First selected area A1 |

In FIG. 3, a plurality of first areas (e.g. the three shadowed blocks) and a plurality of first intensities (e.g. 604, 703 and 3139) are corresponding to the first signal S1. A first maximum (e.g. 3139) of the first intensities can be selected. An area corresponding to the first maximum can be defined as a first selected area A1 (e.g. the block of the coordinates (22,7) in FIG. 3).

Similarly, in FIG. 4, a plurality of second areas (e.g. the shadowed blocks) and a plurality of second intensities are corresponding to the second signal S2. A second maximum (e.g. 355) of the second intensities can be selected. An area corresponding to the second maximum can be defined as a second selected area A2 (e.g. the block of the coordinates (22,9) in FIG. 4).

In FIG. 3 and FIG. 4, the processing circuit 130 can determine the touch event is triggered by the stylus 110 touching the panel 120 when (i) a distance between the first selected area A1 and the second selected area A2 is smaller than a first threshold, and (ii) an absolute difference between the first maximum and the second maximum (e.g. |3139−355|=2784) is greater than a second threshold. These criteria are made according to the effect of the stylus 110 touching the panel 120.

In other words, when a user hold the stylus 110 to touch the panel 120, the first selected area A1 related to the pen-tip portion 112 and the second selected area A2 related to the pen-ring portion 114 will be close to each other, and the difference between the intensities of the first signal S1 and the second signal S2 should be great enough. Hence, the processing circuit 130 can determine whether the touch event is triggered by the stylus 120 according to the two criteria.

Moreover, when the first signal S1 and the second signal S2 having predetermined frequencies are sensed, the processing circuit 130 can perform operations to discern whether the touch event is triggered by noises and/or a hand instead of a stylus, as described below.

FIG. 5 and FIG. 6 are of a scenario where the touch event is not triggered by stylus 110 touching the panel 120. Regarding FIG. 5 and FIG. 6, as FIG. 3 and FIG. 4, a first maximum (e.g. 507 in FIG. 5) of the first intensities can be measured in a first selected area A1 (e.g. the block of the coordinates (52,25) in FIG. 5). A second maximum (e.g. 504 in FIG. 6) of the second intensities can be measured in a second selected area A2 (e.g. the block of the coordinates (52,25) in FIG. 6).

The processing circuit 130 can determine that the stylus 120 does not touch the panel 120 and the touch event is triggered by noises and/or hands when (i) a distance between the first selected area (e.g. A1 in FIG. 5) and the second selected area (e.g. A2 in FIG. 6) is smaller than a first threshold, and (ii) an absolute difference between the first maximum (e.g. 507 in FIG. 5) and the second maximum (e.g. 504 in FIG. 6) is smaller than a second threshold. These criteria are made according to the effect of the stylus 110 touching the panel 120.

According to another embodiment, the processing circuit 130 can determine that the stylus 120 does not touch the panel 120 and the touch event is triggered by noises and/or hands when (i) a distance between the first selected area (e.g. A1 in FIG. 5) and the second selected area (e.g. A) is smaller than a first threshold, (ii) an absolute difference (e.g. |507−504|) between the first maximum (e.g. 507 in FIG. 5) and the second maximum (e.g. 504 in FIG. 6) is smaller than a second threshold, and (iii) the second maximum (e.g. 504 in FIG. 6) is larger than a third threshold. These criteria are made according to the effect of the stylus 110 touching the panel 120.

According to another embodiment, the processing circuit 130 can determine the stylus 120 does not touch the panel 120 and the touch event is triggered by noises and/or hands when (i) a distance between the first selected area (e.g. A1 in FIG. 5) and the second selected area (e.g. A2 in FIG. 6) is smaller than a first threshold, and (ii) a ratio (e.g. 507/504) of the first maximum (e.g. 507 in FIG. 5) to the second maximum (e.g. 504 in FIG. 6) is smaller than a second threshold. These criteria are made according to the effect of the stylus 110 touching the panel 120.

According to another embodiment, the processing circuit 130 can determine the stylus 120 does not touch the panel 120 and the touch event is triggered by noises and/or hands when (i) a distance between the first selected area (e.g. A1 in FIG. 5) and the second selected area (e.g. A2 in FIG. 6) is smaller than a first threshold, (ii) a ratio (e.g. 507/504) of the first maximum (e.g. 507 in FIG. 5) to the second maximum (e.g. 504 in FIG. 6) is smaller than a second threshold, and (iii) the second maximum (e.g. 504 in FIG. 6) is larger than a third threshold. These criteria are made according to the effect of the stylus 110 touching the panel 120.

Figure 7:
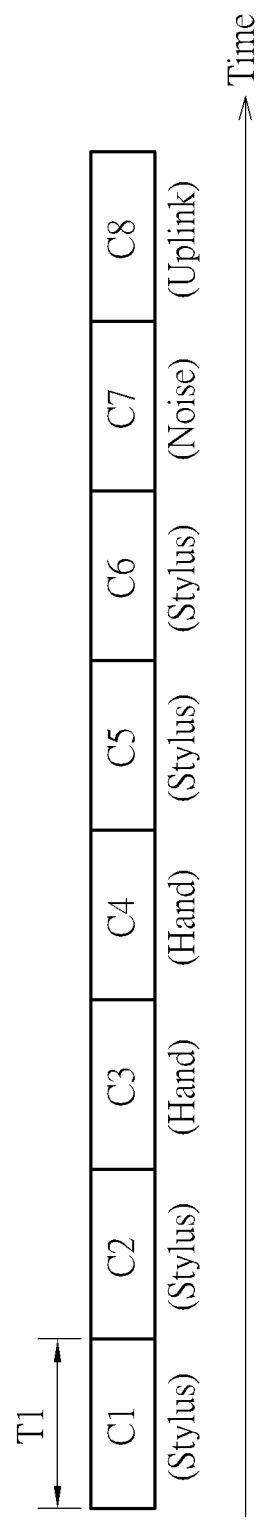
FIG. 7 illustrates a timing diagram of the operations of the touch detection system according to an embodiment.

FIG. 7 illustrates a timing diagram of the operations of the touch detection system 100 according to an embodiment. In the first cycle C1, the second cycle C2, the fifth cycle C5 and the sixth cycle C6, the sensing cells 122 of the panel 120 can detect if the touch event is triggered by the stylus 110. In the third cycle C3 and the fourth cycle C4, the sensing cells 122 of the panel 120 can detect if the touch event is triggered by hand. In the seventh cycle C7, the sensing cells 122 of the panel 120 can detect if the touch event is triggered by noise. In the eighth cycle C8, the sensing cells 122 of the panel 120 can perform an uplink operation to send the sensed information.

The operations of the cycles C1 to C8 can be performed repeatedly. In other words, after the operation of the eighth cycle C8 is finished, the operation of the first cycle C1 can be performed successively. According to embodiments, the sensing cells 122 of the panel 120 should receive the first signal S1 and the second signal S2 during a predetermined time interval (e.g. the time interval T1 in FIG. 7) to perform the touch detection method 200 in FIG. 2. Preferably, the sensing cells 122 of the panel 120 should receive the first signal S1 and the second signal S2 concurrently. The signals sensed in the cycles C1, C2, C5 and C6 can be checked using the touch detection method 200 to discern whether the touch event is triggered by noises and/or a hand instead of a stylus.

In summary, the touch detection system 100 and the touch detection method 200 can be used to determine whether a touch event is triggered by the stylus 110 touching the panel 120 or other factors such as hand touches and/or noises. Hence, the problems of erroneously recognizing hand touches and/or noises as stylus touches are reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch detection system comprising:
   a stylus comprising a pen-tip portion and a pen-ring portion;
   a panel comprising a plurality of sensing cells configured to receive a first signal and a second signal generated by a touch event; and
   a processing circuit coupled to the panel and configured to determine a plurality of first areas and a plurality of first intensities corresponding to the first signal, determine a plurality of second areas and a plurality of second intensities corresponding to a second signal, and determine whether the touch event is triggered by the stylus touching the panel according to the first intensities, first areas, the second intensities and the second areas;
   wherein:
   the first signal is generated from the pen-tip portion, and the second signal is generated from the pen-ring portion;
   a first maximum of the first intensities is corresponding to a first selected area of the first areas;
   a second maximum of the second intensities is corresponding to a second selected area of the second areas;
   the processing circuit determines the stylus does not touch the panel when
      (i) a distance between the first selected area and the second selected area is smaller than a first threshold, and
      (ii) an absolute difference between the first maximum of the first intensities and the second maximum of the second intensities is smaller than a second threshold;
   where the first threshold is within four sensing cells, and the second threshold is between 8% and 12% of the first maximum of the first intensities.

2. The system of claim 1, wherein the plurality of sensing cells of the panel receive the first signal and the second signal during a predetermined time interval.

3. The system of claim 1, wherein:
   the processing circuit determines the stylus does not touch the panel when
      (i) the distance between the first selected area and the second selected area is smaller than the first threshold;
      (ii) the absolute difference between the first maximum of the first intensities and the second maximum of the second intensities is smaller than the second threshold; and
      (iii) the second maximum of the second intensities is larger than a third threshold.

4. The system of claim 1, wherein:
   the processing circuit determines the stylus does not touch the panel when
      (i) the distance between the first selected area and the second selected area is smaller than the first threshold; and
      (ii) a ratio of the first maximum of the first intensities to the second maximum of the second intensities is smaller than a third threshold.

5. The system of claim 1, wherein:
   the processing circuit determines the stylus does not touch the panel when
      (i) the distance between the first selected area and the second selected area is smaller than the first threshold;
      (ii) a ratio of the first maximum of the first intensities to the second maximum of the second intensities is smaller than a third threshold; and
      (iii) the second maximum of the second intensities is larger than a fourth threshold.

6. The system of claim 1, wherein:
the processing circuit determines the stylus touches the panel when
  (i) the distance between the first selected area and the second selected area is smaller than the first threshold; and
  (ii) the absolute difference between the first maximum of the first intensities and the second maximum of the second intensities is greater than the second threshold.

7. A touch detection method for a touch detection system, the touch detection system comprising a stylus, a panel comprising a plurality of sensing cells, and a processing circuit coupled to the panel, the method comprising:
the sensing cells receiving a first signal and a second signal generated by a touch event;
the processing circuit determining a plurality of first areas and a plurality of first intensities corresponding to the first signal;
the processing circuit determining a plurality of second areas and a plurality of second intensities corresponding to a second signal; and
the processing circuit determining whether the touch event is triggered by the stylus touching the panel according to the first intensities, first areas, the second intensities and the second areas;
wherein:
the stylus comprises a pen-tip portion and a pen-ring portion, the first signal is generated from the pen-tip portion, and the second signal is generated from the pen-ring portion;
a first maximum of the first intensities is corresponding to a first selected area of the first areas;
a second maximum of the second intensities is corresponding to a second selected area of the second areas;
the processing circuit determines the stylus does not touch the panel when
  (i) a distance between the first selected area and the second selected area is smaller than a first threshold, and
  (ii) an absolute difference between the first maximum of the first intensities and the second maximum of the second intensities is smaller than a second threshold;
wherein the first threshold is within four sensing cells, and the second threshold is between 8% and 12% of the first maximum of the first intensities.

8. The method of claim 7, wherein:
the sensing cells receive the first signal and the second signal during a predetermined time interval.

9. The method of claim 7, wherein:
the processing circuit determines the stylus does not touch the panel when
  (i) the distance between the first selected area and the second selected area is smaller than the first threshold;
  (ii) the absolute difference between the first maximum of the first intensities and the second maximum of the second intensities is smaller than the second threshold; and
  (iii) the second maximum of the second intensities is larger than a third threshold.

10. The method of claim 7, wherein:
the processing circuit determines the stylus does not touch the panel when
  (i) the distance between the first selected area and the second selected area is smaller than the first threshold; and
  (ii) a ratio of the first maximum of the first intensities to the second maximum of the second intensities is smaller than a third threshold.

11. The method of claim 7, wherein:
the processing circuit determines the stylus does not touch the panel when
  (i) the distance between the first selected area and the second selected area is smaller than the first threshold;
  (ii) a ratio of the first maximum of the first intensities to the second maximum of the second intensities is smaller than a third threshold; and
  (iii) the second maximum of the second intensities is larger than a fourth threshold.

12. The method of claim 7, wherein:
the processing circuit determines the stylus touches the panel when
  (i) the distance between the first selected area and the second selected area is shorter than the first threshold; and
  (ii) the absolute difference between the first maximum of the first intensities and the second maximum of the second intensities is greater than the second threshold.

13. The method of claim 7, wherein the first signal has a first frequency, and the second signal has a second frequency different from the first frequency.

* * * * *